(12) United States Patent
Bögl

(10) Patent No.: US 11,290,885 B2
(45) Date of Patent: Mar. 29, 2022

(54) COMMUNICATION SYSTEM AND METHOD

(71) Applicant: Rohde & Schwarz GmbH & Co. KG, Munich (DE)

(72) Inventor: Thomas Bögl, Augsburg (DE)

(73) Assignee: ROHDE & SCHWARZ GMBH & CO. KG, Munich (DE)

( * ) Notice: Subject to any disclaimer, the term of this patent is extended or adjusted under 35 U.S.C. 154(b) by 229 days.

(21) Appl. No.: 16/674,691

(22) Filed: Nov. 5, 2019

(65) Prior Publication Data
US 2020/0204998 A1 Jun. 25, 2020

(30) Foreign Application Priority Data
Dec. 19, 2018 (EP) .................................. 18214061

(51) Int. Cl.
*H04W 12/069* (2021.01)
*H04L 9/32* (2006.01)
(Continued)

(52) U.S. Cl.
CPC ......... *H04W 12/069* (2021.01); *H04L 9/3268* (2013.01); *H04L 63/0428* (2013.01);
(Continued)

(58) Field of Classification Search
None
See application file for complete search history.

(56) References Cited

U.S. PATENT DOCUMENTS 5,455,158 A  10/1995  Vogel et al.
5,679,320 A  10/1997  Vogel et al.
(Continued)

FOREIGN PATENT DOCUMENTS

AU  2003267863 A1  11/2003
AU  2015101022 A4  9/2015
(Continued)

OTHER PUBLICATIONS

Extended European search report for European Application No. 18214061.6, dated Jun. 7, 2019, 8 pages.

*Primary Examiner* — Brandon S Hoffman
(74) *Attorney, Agent, or Firm* — Westman, Champlin & Koehler, P.A.

(57) ABSTRACT

The present invention relates to a communication system is provided, wherein the communication system comprising: a first communication unit, comprising a first communication processor for providing communication via a first channel, at least one second communication unit separate to the first communication unit, comprising a second communication processor for providing communication via a second channel, a coupling unit for coupling the first communication unit with the at least one second communication unit, wherein the first communication unit further comprises: a communication control unit coupled to the second communication unit via the coupling unit, wherein the communication control unit is configured to enable the mutual utilization of electronic resources between the first and second communication unit, and an encryption unit for providing encrypted communication via as well the first communication channel and the second communication channel. The present invention further relates to a communication method.

20 Claims, 3 Drawing Sheets

(51) Int. Cl.
*H04L 29/06* (2006.01)
*H04W 12/033* (2021.01)

(52) U.S. Cl.
CPC ........... *H04L 63/18* (2013.01); *H04W 12/033* (2021.01); *H04L 2209/80* (2013.01)

(56) References Cited

U.S. PATENT DOCUMENTS

| | | | |
|---|---|---|---|
| 5,965,383 A | 10/1999 | Vogel et al. | |
| 7,087,722 B1 | 8/2006 | Vogel et al. | |
| 7,657,755 B2 | 2/2010 | Bricher et al. | |
| 8,677,150 B2 | 3/2014 | Wang et al. | |
| 8,886,253 B2 | 11/2014 | Pärssinen et al. | |
| 9,615,251 B2 | 4/2017 | Langguth et al. | |
| 9,836,906 B2 | 12/2017 | Carstens et al. | |
| 9,852,567 B2 | 12/2017 | Hild et al. | |
| 9,940,768 B2 | 4/2018 | Carstens et al. | |
| 9,959,692 B2 | 5/2018 | Hild et al. | |
| 10,424,144 B2 | 9/2019 | Carstens et al. | |
| 10,431,029 B2 | 10/2019 | Carstens et al. | |
| 10,580,241 B2 | 3/2020 | Carstens et al. | |
| 2005/0216750 A1 | 9/2005 | Bricher et al. | |
| 2006/0025897 A1 | 2/2006 | Shostak et al. | |
| 2006/0059537 A1 | 3/2006 | Alvermann et al. | |
| 2006/0220842 A1 | 10/2006 | Breed | |
| 2006/0244581 A1 | 11/2006 | Breed et al. | |
| 2007/0005202 A1 | 1/2007 | Breed | |
| 2007/0139216 A1 | 6/2007 | Breed | |
| 2008/0047329 A1 | 2/2008 | Breed | |
| 2008/0140278 A1 | 6/2008 | Breed | |
| 2008/0147271 A1 | 6/2008 | Breed | |
| 2009/0119981 A1 | 5/2009 | Drozd et al. | |
| 2009/0272028 A1 | 11/2009 | Drozd et al. | |
| 2011/0190029 A1 | 8/2011 | Pärssinen et al. | |
| 2012/0296567 A1 | 11/2012 | Breed | |
| 2013/0173233 A1 | 7/2013 | Cheatham, III et al. | |
| 2013/0198530 A1 | 8/2013 | Wang et al. | |
| 2014/0092771 A1 | 4/2014 | Siomina et al. | |
| 2014/0344420 A1* | 11/2014 | Rjeili ................... H04L 67/10 709/220 | |
| 2015/0040198 A1 | 2/2015 | Gopalakrishnan et al. | |
| 2015/0350903 A1 | 12/2015 | Langguth et al. | |
| 2016/0265253 A1 | 9/2016 | Carstens et al. | |
| 2016/0267738 A1 | 9/2016 | Carstens et al. | |
| 2016/0269168 A1 | 9/2016 | Carstens et al. | |
| 2016/0275733 A1 | 9/2016 | Carstens et al. | |
| 2016/0275735 A1 | 9/2016 | Carstens et al. | |
| 2016/0275740 A1 | 9/2016 | Hild et al. | |
| 2016/0275741 A1 | 9/2016 | Carstens et al. | |
| 2018/0151013 A1 | 5/2018 | Carstens et al. | |
| 2018/0241417 A1 | 8/2018 | Aschauer | |

FOREIGN PATENT DOCUMENTS

| | | | |
|---|---|---|---|
| CA | 2083271 C | 4/2002 | |
| CA | 2501982 A1 | 9/2005 | |
| CA | 2502158 A1 | 9/2005 | |
| CA | 2502161 A1 | 9/2005 | |
| CA | 2502164 A1 | 9/2005 | |
| CA | 2502166 A1 | 9/2005 | |
| CA | 2502167 A1 | 9/2005 | |
| CA | 2006929 C | 10/2005 | |
| CA | 2634842 A1 | 12/2008 | |
| CA | 2839654 A1 | 2/2013 | |
| CA | 2870124 A1 | 11/2013 | |
| CN | 102143603 A | 8/2011 | |
| DE | 102013100934 A1 | 8/2013 | |
| DE | 102014105244 A1 | 6/2015 | |
| DE | 102015217724 A1 | 3/2017 | |
| EP | 1283995 A1 | 2/2003 | |
| EP | 1 580 932 A2 | 9/2005 | |
| EP | 2 354 934 A1 | 8/2011 | |
| EP | 2423885 A1 | 2/2012 | |
| EP | 2549401 A1 | 1/2013 | |
| EP | 2911363 B1 | 9/2017 | |
| GB | 2299026 A | 9/1996 | |
| WO | 9638945 A1 | 12/1996 | |
| WO | 9822034 A2 | 5/1998 | |
| WO | 2008076147 A2 | 6/2008 | |
| WO | 2010004472 A2 | 1/2010 | |
| WO | 2010021719 A1 | 2/2010 | |
| WO | 2010149840 A1 | 12/2010 | |
| WO | 2011097649 A2 | 8/2011 | |
| WO | 2012/109286 A1 | 8/2012 | |
| WO | WO-2012109286 A1 * | 8/2012 | ............ H04L 63/18 |
| WO | 2013012798 A1 | 1/2013 | |
| WO | 2013012822 A1 | 1/2013 | |

* cited by examiner

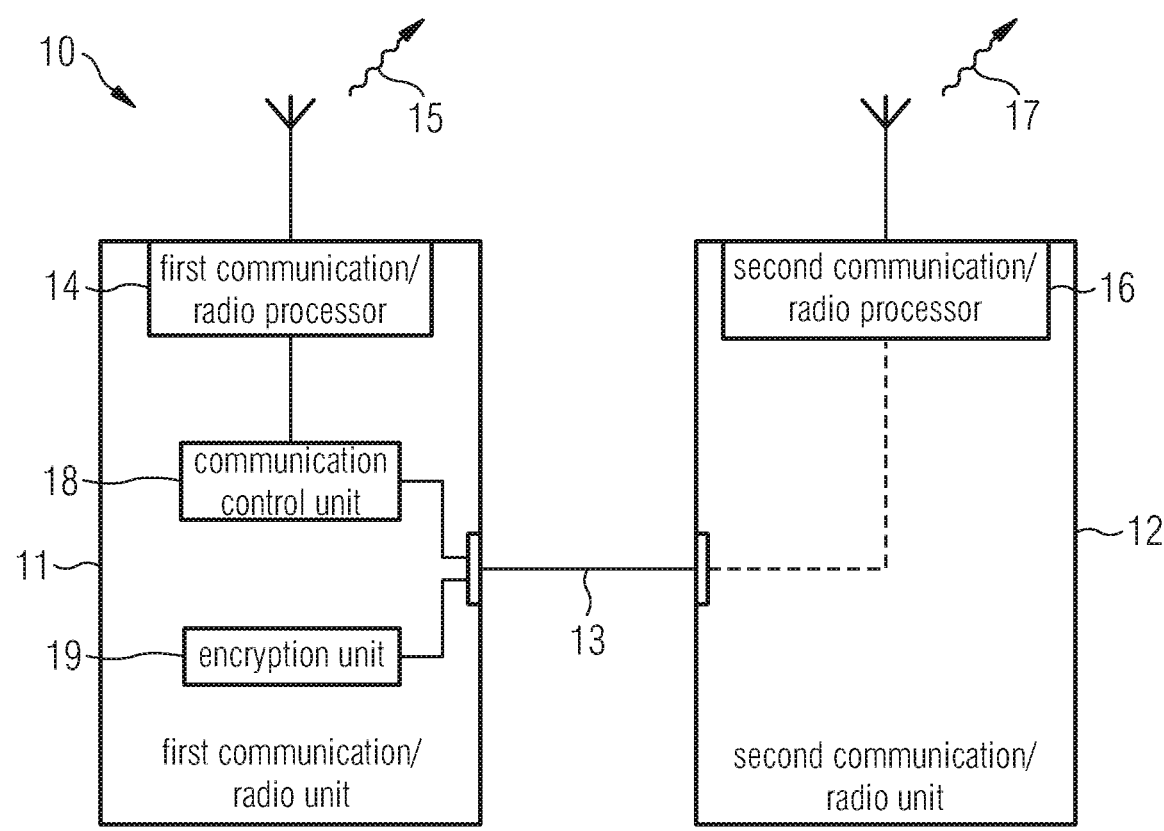

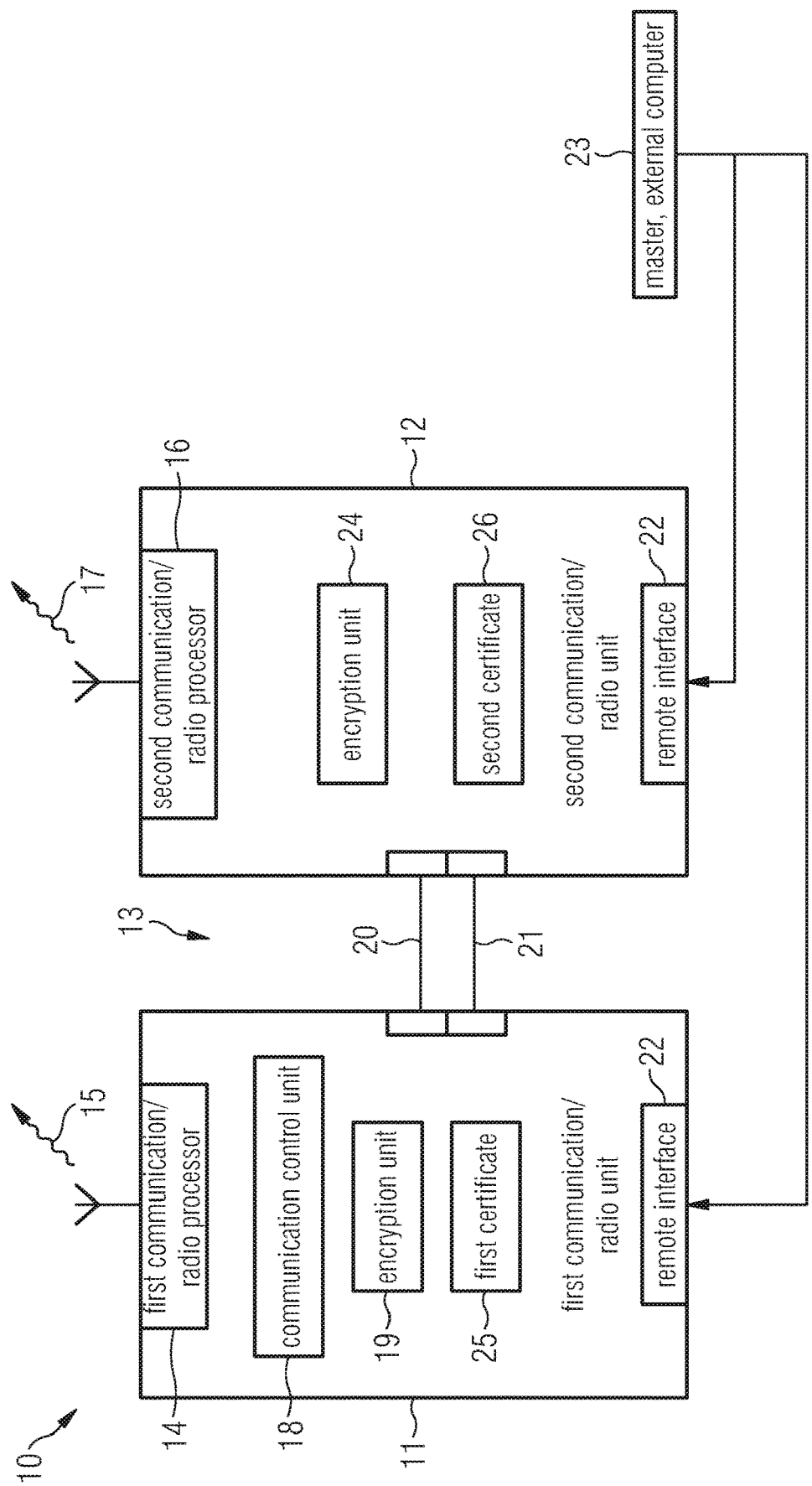

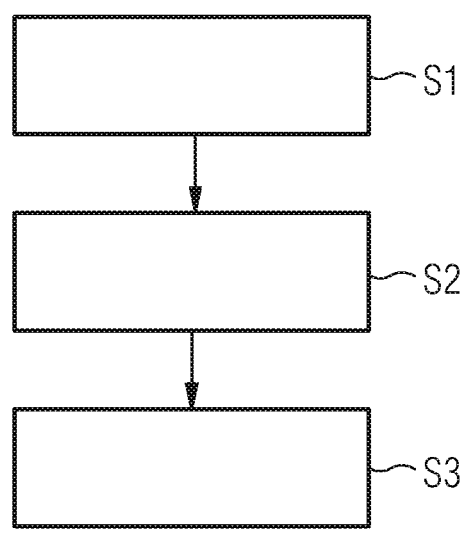

COMMUNICATION SYSTEM AND METHOD

CROSS-REFERENCE TO RELATED APPLICATION

This application claims priority to European Patent Application No. 18214061.6, filed on Dec. 19, 2018, the content of which is incorporated herein by reference.

FIELD OF THE INVENTION

The present invention relates to a communication system having a first communication unit and at least one second communication unit. The present invention further relates to a communication method.

TECHNICAL BACKGROUND

The present invention and its underlying problem are hereinafter described by the example of radio communication system having at least one radio unit (or radio device or shortly radio), however, it should be understood that the present invention is not restricted to this application, but may also be usable generally for communication systems.

Nowadays, radios must have several levels of reliability. A distinction has to be made between highly secure architectures for computer systems to create Multiple Independent Levels of Security (MILS) and the Multiple Independent Levels of Safety (MILSF), wherein MILSF radios are mainly used in avionics and air traffic control (ATC).

As a consequence of this, users are sometimes in possession of several radios due to the fact that radio communication for security-relevant applications usually have to be protected with an appropriate encryption, but not every radio supports the necessary or required encryption. On the other hand, the certification of a radio often depends on the country of origin used, so that not every radio can be used in another country. However, up to now, different radios are managed and operate completely independently of each other, which is costly and uncomfortable for the user. Intuitively, these recipients typically believe that different radios correlate with different users, which is not the case here.

For users of such radios, the use and handling of a plurality of radios is not comfortable. The same applies sometimes for the recipient.

European Patent EP 2 911 363 B1 describes a radio device having a first radio unit and a second radio unit having different functionality. The first radio unit is functionally separated from the second radio unit by means of a software separation kernel. The first radio unit and the second radio unit access common hardware resources of the radio device, whereby the first radio unit and the second radio unit access common hardware resources of the radio device.

SUMMARY OF THE INVENTION

Against this background, there is the need to provide to a user a more comfortable, but nevertheless secure possibility to use different radios.

The present invention provides a communication system and a communication method having the features of the independent claims.

According thereto, the following is provided:

A communication system, wherein the communication system comprising: a first communication unit, comprising a first communication processor for providing communication via a first channel, at least one second communication unit separate to the first communication unit, comprising a second communication processor for providing communication via a second channel, a coupling unit for coupling the first communication unit with the at least one second communication unit, wherein the first communication unit further comprises: a communication control unit coupled to the second communication unit via the coupling unit, wherein the communication control unit is configured to enable the mutual utilization of electronic resources between the first and second communication unit, and an encryption unit for providing encrypted communication via as well the first communication channel and the second communication channel.

A communication method, in particular by using a communication system according to the present invention, the method comprising: providing, by a first communication unit, a communication via a first communication channel; providing, by a second, separate communication unit, a communication via a second, separate communication channel; and coupling the first communication unit with the second communication unit such that the first communication unit enables the mutual utilization of electronic resources between the first communication unit and the second communication unit and such that the first communication unit provides encrypted communication via as well the first communication channel and the second communication channel.

The present invention is based on the concept of providing a communication system, such as a radio communication system, that shares hardware and software resources by suitably coupling to each other the at least two communication units of the communication system. For this purpose, a coupling unit for suitably coupling the both communication units and a communication control unit for controlling the mutual use of the hardware and software resources are provided. That enables the simultaneous operation of two originally separated communication units. Further, this solution according to the present invention provides a significant simplification of the system layout of the communication system by combining originally separate and different communication units into one new unit with reduced system management effort.

Or in other words: With the solution according to the present invention, a first communication unit extends a second communication unit by at least one communication channel, wherein the parallel use of both or more communication channels is now possible.

In addition, an encryption unit is provided by the first communication unit, which can also be used by the other communication unit, i.e. the second communication unit, via the coupling device. The second communication unit therefore does not require its own encryption unit and is nevertheless able to carry out encrypted communication with other communication subscribers using the encryption resources of the first communication unit. This is particularly advantageous, since by this means also second communication units, which for example in the absence of a corresponding certification, are now fully functional with regard to the encryption and can be effectively used as the first communication unit.

Advantageous configurations and developments emerge from the further dependent claims and from the description with reference to the figures of the drawings.

In a preferred embodiment, the communication control unit and the encryption unit are configured such that the first communication unit and the second communication unit are exposed to an outside external subscriber as a single communication unit. This way, to an external subscriber only one single communication unit is visible and the whole communication system acts and can be operated as one communication unit.

In a particular preferred and advantageous application, the communication system is a radio communication system. In the radio communication system—or shortly radio system—the first communication unit is specifically a first radio unit having a first radio processor for providing radio communication via a first radio channel and for controlling the function of the first radio unit. The second communication unit of the radio communication system is designed as a second radio unit having a second radio processor for providing radio communication via a second radio channel. The second radio unit is separate to the first radio unit such that it is independently operable. In particular, the second radio unit does not need an own encryption unit and/or certificate as it can use the encryption resources and/or certificate resources, respectively, of the first radio unit.

In an additional embodiment, at least one of the radio units is multiband capable, i.e. at least one of the radio units is able to execute a radio transmission using different frequency bands (such as HF, VHF and UHF). Preferably, at least one of the radio units is a software defined radio unit.

In a particular preferred embodiment, the encryption unit is configured to provide payload encryption. The payload encryption offers a fast and secure (such as Advanced Encryption Standard (AES) 256) transport of IP voice, video and data since with payload encryption the service content as well as the optional message attachments are encrypted. This is in particular preferential for security relevant applications, such as for avionic, police or military applications.

In a further embodiment, the coupling unit is configured for enabling data communication and/or exchange of data between the first and second communication unit.

In a further embodiment, the coupling unit is configured to organize communication of the first and second communication unit, in particular the radio communication. The two functionalities of the coupling unit, i.e. the data communication on the one hand and the organization of the communication on the other hand, can each be implemented in a common unit or also functionally implemented in separate units.

In a further preferred configuration, the coupling unit comprises a hardwired connection between the first and second communication unit.

In a further configuration, at least one of the communication units, i.e. the first communication unit and/or the second communication unit, further comprises a remote interface. The remote interface is configured to enable the configuration of the corresponding communication unit by an external master, such as a computer, control device, processor, etc. In particular, by employing the remote interface it is possible to set the frequency of the communications or radio signals, respectively, to enable remote maintenance, to provide remote control of the communication unit, etc.

According to one aspect, at least one of the first and second communication channels is a wired channel.

According to another or additional one aspect, at least one of the first and second communication channels is a wireless channel.

In a further preferred embodiment, at least one of the second communication units comprises a further encryption unit. The further encryption unit is configured to provide encrypted communication via as well the first communication channel and the second communication channel. The encryption provided by the further encryption unit is preferably different to the encryption provided by the (first) encryption unit of the first communication unit. The advantage of this is that each communication unit provides different encryption. The different communication units of the communication system are thus able to use all existing encryption types of the communication system, which represents a very simple, but nevertheless very efficient functional expansion with regard to encryption.

In a further preferred embodiment, the first communication unit has a certified first functionality which is certified by a first (authorized) certification authority. Additionally, or alternatively, the second communication unit has a certified second functionality which is certified by a second (authorized) certification authority. In a particular preferred embodiment, the first certification authority which provided the certified first functionality may be different to the second certification authority that provided the certified second functionality.

The advantages of this embodiment are in particular that preferably both communication units are fully certified, wherein both communication units are certified according to their functionalities. For radio communication, the preferred functionality is a property required for radio communication, in particular an encryption algorithm, a specific waveform and/or a specific type of transmission. In addition, functionality is also considered to include an operational state or mode of the communication unit, such as multi-stage standby or listening mode, which must meet specific criteria of a standard. Generally speaking, functionality is the ability of the communication unit to perform a specific function or group of functions. This refers mainly to usability, so that the first communication unit may ensures for example a complex communication, for example by means of encryption or complex waveforms, while the second radio unit enables a comparably simple radio transmission.

Different certificates are preferred for the different functionalities so that a certificate provided by at least one of the first and second certification authorities is for example a security certificate and/or an information certificate.

According to another idea of the invention, a high degree of reliability and thus a low degree of complexity of the functionality can be realized in one communication unit, such as for an emergency radio feature. Alternatively, the other communication unit offers preferably higher quality and more complex structure of its functionality in order to be able to implement more complex communication. As an example, an encrypted transmission is carried out with this communication unit. Such complex and highly secure communication procedures are certified by means of a second certificate in order to indicate the trustworthiness of this radio unit.

In one configuration, the certificate of at least one communication unit is preferably a security certificate. This is required in particular for flight safety for simple functions, in particular emergency operation. In the case of safety certificates, updates are always associated with a recertification, which in turn means a high evaluation effort. In another preferred configuration, the certificate of at least one communication unit is an information certificate. This certificate fulfils the Common Criteria of the so-called SCA certificate. The "Common Criteria for Information Technology Security Evaluation" (CC) is an international standard on the criteria for evaluating and certifying the security of computer systems with regard to data security and the corresponding unauthorized manipulation of data.

According to one particular preferred embodiment, it is possible that new and especially complex waveforms—which are always newly developed as transmission methods—can be integrated into the respective communication unit without the already acquired certificate becoming invalid. In particular, it is intended that the certificate will continue to be valid after an extension of the respective communication unit with regard to its functionality. A new functionality can be, in particular, a new waveform that is loaded as part of a Service Component Architecture (SCA) certificate.

Where appropriate, the above-mentioned configurations and developments can be combined in any manner. Further possible configurations, developments and implementations of the invention also include combinations, which are not explicitly mentioned, of features of the invention which have been described previously or are described in the following with reference to the embodiments. In particular, in this case, a person skilled in the art will also add individual aspects as improvements or supplements to the basic form of the present invention.

CONTENT OF THE DRAWINGS

The present invention is described in greater detail in the following on the basis of the embodiments shown in the schematic figures of the drawings, in which:

FIG. 1 shows a schematic overview of a first embodiment of a communication system according to the present invention;

FIG. 2 shows a schematic overview of a second, detailed embodiment of a radio communication system according to the present invention;

FIG. 3 shows a flow chart of an embodiment of a communication method according to the invention.

The appended drawings are intended to provide further understanding of the embodiments of the invention. They illustrate embodiments and, in conjunction with the description, help to explain principles and concepts of the invention. Other embodiments and many of the advantages mentioned become apparent in view of the drawings. The elements in the drawings are not necessarily shown to scale.

In the drawings, like, functionally equivalent and identically operating elements, features and components are provided with like reference signs in each case, unless stated otherwise.

DESCRIPTION OF EMBODIMENTS

FIG. 1 shows a schematic overview of a communication system according to the present invention.

In FIG. 1, the communication system is denoted by reference sign 10. The communication system 10 comprises a first communication unit 11, a separate second communication unit 12 and a coupling unit 13.

The first communication unit 11 comprises a communication processor 14 for providing communication via a first channel 15. Likewise, the second communication unit 12 comprises another communication processor 16 for providing communication via a second channel 17. The first and second communication channels 15, 17 can be wired channels or/and wireless channels.

The coupling unit 13 preferably includes a hard-wired connection between the communication unit 11 and the second communication unit 12, such as a NATO plug and NATO connector. However, the coupling unit 13 may also be a wireless connection between the both communication units 11, 12. The coupling unit 13 couples the first communication unit 11 with the second communication unit 12 such that the first and second communication units 11, 12 are able to use the hardware and software resources from the corresponding other communication unit 11, 12.

For this purpose, the first communication unit 11 further comprises a communication control unit 18 and an encryption unit 19. The communication control unit 18 and the encryption unit 19 are configured such that the first communication unit 11 and the second communication unit 12 are exposed to an outside external subscriber as a single unit.

The communication control unit 18 of the first communication unit 11 is coupled to the second communication unit 12 via the coupling unit 13. The communication control unit 18 is configured to control the communication of the second communication unit 12, which includes the setting of security levels which is needed for a specific communication of the second communication unit 12. In particular, the communication control unit 18 can define that e.g. for security purposes a specific waveform has to be used for a specific radio transmission. The communication control unit 18 may also define the type of communication, for example a radio communication, a specific frequency band (such as HF, VHF and UHF) which should be used for the transmission of signals, etc.

The communication control unit 18 is further configured to enable the mutual utilization of electronic resources between the communication units 11, 12. The mutual utilization of resources in particular (but not only) refers to the encryption function which is provided by the encryption unit 19. As such, the encryption unit 19 of the first communication unit 11 provides encrypted communication not only for the first communication channel but via the coupling unit 13 also for the second communication channel of the second communication unit 12.

FIG. 2 shows a schematic overview of a second, detailed embodiment of a communication system according to the present invention.

In the embodiment shown in FIG. 2, the communication system 10 is a radio communication system 10 which comprises a first radio unit 11 and a second radio unit 12. The first radio unit 11 comprises a first radio processor 14 for providing radio communication via a first radio channel 15. The second radio unit 12 comprises a second radio processor 16 for providing radio communication via a second radio channel 17.

The coupling unit 13 comprises a data interface 20. The data interface 20 enables data communication and/or the exchange of data between the first and second radio units 11, 12.

The coupling unit 13 further comprises a further interface 21. The further interface 21 organizes the radio communication of the first and second radio units 11, 12.

Each of the first and second radio units 11, 12 further comprises a remote interface 22. The remote interfaces 22 are used for enabling an external master computer 23 to access to and to configure the corresponding first and second radio units 11, 12.

In the embodiment shown in FIG. 2, the second radio unit 12 also comprises an encryption unit 24. This further encryption unit 24 within the second radio unit 12 provides a different encryption to the encryption provided by the encryption unit 19. As such, with this embodiment it is possible to provide encrypted communication either by the encryption unit 19 or by the encryption unit 24 so that the radio communication systems collectively provides a plurality of encryption types for their radio communications.

The first radio unit 11 comprises a first certificate 25 provided by a first authorized certification authority. The second radio unit 12 comprises no certificate or a second certificate 26 provided by a second authorized certification authority. Preferably, the first certificate 25 is different to the second certificate 26.

FIG. 3 shows a flow chart of an embodiment of a method according to the invention.

In one step S1, a communication via a first communication channel is provided by a first communication unit.

In one other step S2, a communication via a second communication channel is provided by a second, separate communication unit.

The method further comprises the step S3 of coupling the first communication unit with the second communication unit. This coupling step S3 includes the mutual utilization of electronic resources between the first communication unit and the second communication unit, which is controlled by the first communication unit. The coupling step S3 further includes providing by the first communication unit encrypted communication via as well the first communication channel and the second communication channel.

Although the present invention has been described in the above by way of preferred embodiments, it is not limited thereto, but rather can be modified in a wide range of ways. In particular, the invention can be changed or modified in various ways without deviating from the core of the invention.

LIST OF REFERENCE SIGNS 10 (radio) communication system
11 first communication/radio unit
12 second communication/radio unit
13 coupling unit
14 first communication/radio processor
15 first (radio) channel
16 second communication/radio processor
17 second (radio) channel
18 communication control unit
19 encryption unit
20 data interface
21 interface
22 remote interface
23 master, external computer
24 encryption unit
25 first certificate
26 second certificate
S1-S3 method steps

What I claim is:

1. A communication system, the communication system comprising:
   a first communication unit, comprising a first communication processor for providing communication via a first channel,
   at least one second communication unit separate to the first communication unit, comprising a second communication processor for providing communication via a second channel,
   a coupling unit for coupling the first communication unit with the at least one second communication unit,
   wherein the first communication unit further comprises:
      an encryption unit for providing encrypted communication via the first communication channel and the second communication channel, and
      a communication control unit coupled to the second communication unit via the coupling unit, wherein the communication control unit is configured to control the communication of the second communication unit and to enable the mutual utilization of electronic resources between the first and second communication unit wherein mutual utilization of electronic resources refers to an encryption function provided by the encryption unit, such that the encryption unit is further configured to provide encrypted communication to the second communication channel of the second communication unit via the coupling unit.

2. The communication system of claim 1, wherein the communication control unit and the encryption unit are configured such that the first communication unit and the second communication unit are exposed to an outside external subscriber as a single unit.

3. The communication system of claim 1, wherein the communication system is a radio communication system in which the first communication unit is designed as a first radio unit having a first radio processor for providing radio communication via a first radio channel and in which the second communication unit is designed as a second radio unit having a second radio processor for providing radio communication via a second radio channel.

4. The communication system of claim 3, wherein at least one of the radio units is multiband capable.

5. The communication system of claim 1, wherein the encryption unit is configured to provide payload encryption.

6. The communication system of claim 1, wherein the coupling unit is configured for enabling data communication between the first and second communication unit.

7. The communication system of claim 1, wherein the coupling unit is configured for enabling exchange of data between the first and second communication unit.

8. The communication system of claim 1, wherein the coupling unit is configured to organize communication of the first and second communication unit.

9. The communication system of claim 8, wherein the coupling unit is configured to organize radio communication of the first and second communication unit.

10. The communication system of claim 1, wherein the coupling unit comprises a hardwired connection between the first and second communication unit.

11. The communication system of claim 1, wherein at least one of the first and second communication units further comprises a remote interface via which the corresponding first and second communication unit can be configured by an external master.

12. The communication system of claim 1, wherein at least one of the first and second communication channels is a wired channel.

13. The communication system of claim 1, wherein at least one of the first and second communication channels is a wireless channel.

14. The communication system of claim 1, wherein at least one of the second communication units comprises a further encryption unit, wherein the further encryption unit is configured to provide encrypted communication.

15. The communication system of claim 14, wherein the encryption provided by the further encryption unit is different to the encryption provided by the encryption unit.

16. The communication system of claim 1, wherein the first communication unit has a certified first functionality which is certified by a first authorized certification authority and wherein the second communication unit has a certified second functionality which is certified by a second authorized certification authority.

17. The communication system of claim 16, wherein the first authorized certification authority is different to the second authorized certification authority.

18. The communication system of claim 16, wherein a certificate provided by at least one of the first and second authorized certification authorities is a security certificate.

19. The communication system of claim 16, wherein a certificate provided by at least one of the first and second authorized certification authorities is an information certificate.

20. A communication method, the method comprising:
providing, by a first communication unit, a communication via a first communication channel;
providing, by a second, separate communication unit, a communication via a second, separate communication channel; and
coupling the first communication unit with the second communication unit via a coupling unit such that the first communication unit enables the mutual utilization of electronic resources between the first communication unit and the second communication unit, wherein the mutual utilization of electronic resources refers to an encryption function provided by an encryption unit, such that the first communication unit provides encrypted communication to the second communication channel of the second communication unit.

* * * * *